United States Patent
Jayachandran

(10) Patent No.: US 11,004,130 B2
(45) Date of Patent: May 11, 2021

(54) COMPUTER IMPLEMENTED METHOD, AN APPARATUS AND A NON TRANSITORY COMPUTER READABLE STORAGE MEDIUM FOR VERIFYING REVIEWS ON A BLOCKCHAIN

(71) Applicant: International Business Machines Corporation, Armonk, NY (US)

(72) Inventor: Praveen Jayachandran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 600 days.

(21) Appl. No.: 15/334,654

(22) Filed: Oct. 26, 2016

(65) Prior Publication Data

US 2018/0114261 A1 Apr. 26, 2018

(51) Int. Cl.
*G06Q 30/06* (2012.01)
*G06Q 30/02* (2012.01)
*G06Q 30/00* (2012.01)

(52) U.S. Cl.
CPC ......... *G06Q 30/0623* (2013.01); *G06Q 30/00* (2013.01); *G06Q 30/0282* (2013.01)

(58) Field of Classification Search
CPC ............. G06Q 30/0623; G06Q 30/0601–0645
USPC ................................................. 705/26.1–27.2
See application file for complete search history.

(56) References Cited

U.S. PATENT DOCUMENTS

| | | | | |
|---|---|---|---|---|
| 2007/0168298 A1* | 7/2007 | George | ................. | G06Q 30/06 705/75 |
| 2014/0122369 A1* | 5/2014 | Chow | ................ | G06Q 30/0282 705/347 |
| 2014/0258169 A1 | 9/2014 | Wong et al. | | |
| 2015/0220928 A1 | 8/2015 | Allen | | |
| 2016/0203527 A1* | 7/2016 | Grasso | ............... | G06Q 30/0282 705/51 |
| 2017/0046698 A1* | 2/2017 | Haldenby | .......... | G06Q 20/0655 |
| 2017/0054611 A1* | 2/2017 | Tiell | ...................... | G06F 16/285 |
| 2017/0111175 A1* | 4/2017 | Oberhauser | ............ | G06Q 10/06 |
| 2017/0364825 A1* | 12/2017 | Tiell | ................... | G06Q 10/0635 |

FOREIGN PATENT DOCUMENTS

WO    WO2014049622 A1    4/2014

OTHER PUBLICATIONS

Rob Marvin, "Blockchain A-Z: Everything you need to know about the game-changing tech beneath bitcoin" Jun. 3, 2016, PC Mag (Year: 2016).*

Anonymously; System and method to auto generate a transparent, and unbiased rating for an item in an e-commerce website, Apr. 13, 2016.

Anonymously; Method and system for creating authentic and trusted online reviews, Dec. 30, 2013.

* cited by examiner

*Primary Examiner* — Allison G Wood
*Assistant Examiner* — Jason B Warren

(57) ABSTRACT

A blockchain configuration may be used to store a distributed ledger for product review verification procedure. One example method of operation may include receiving a product review for a product purchase transaction by a purchasing entity, validating the product review was submitted by the purchasing entity by referencing the product purchase transaction in a blockchain, storing the product review and product purchase transaction, creating a link to the product review, and transmitting the link to a product site where the product can be purchased.

14 Claims, 5 Drawing Sheets

300

350

COMPUTER IMPLEMENTED METHOD, AN APPARATUS AND A NON TRANSITORY COMPUTER READABLE STORAGE MEDIUM FOR VERIFYING REVIEWS ON A BLOCKCHAIN

TECHNICAL FIELD

This application relates to verifying the authenticity of reviews conducted on a blockchain and more specifically to verifying a purchase transaction correlates to a product review by a same source via blockchain transactions and records.

BACKGROUND

In a blockchain configuration, the information that is normally logged with blockchain transactions is available for auditing purposes to third parties interested in obtaining such information. There are various e-commerce platforms with customized review and reputation configurations and are valued highly for their rich sources of information on travel destinations, lodging options, etc. However, reviews may still be fabricated and may not be authentic. E-commerce aggregators and buyers experience a problem with authenticity of reviews, as sellers themselves tend to pose as buyers and write favorable reviews for their products and services. Further, given the abundance of e-commerce sellers and aggregators, buyers do not have a consolidated platform of reviews since reviews for a new product on various sites may provide very contradictory reviews, recommendation scores and the like.

SUMMARY

One example embodiment may include a method that comprises one or more of receiving a product review for a product purchase transaction by a purchasing entity, validating the product review was submitted by the purchasing entity by referencing the product purchase transaction in a blockchain, storing the product review and product purchase transaction, creating a link to the product review, and transmitting the link to a product site where the product can be purchased.

Another example embodiment may include an apparatus that comprises one or more of configured to receive a product review for a product purchase transaction by a purchasing entity, a processor configured to validate the product review was submitted by the purchasing entity and reference the product purchase transaction in a blockchain, store the product review and product purchase transaction, create a link to the product review; and a transmitter configured to transmit the link to a product site where the product can be purchased.

Another example embodiment may include a non-transitory computer readable storage medium configured to store instructions that when executed causes a processor to perform one or more of receiving a product review for a product purchase transaction by a purchasing entity, validating the product review was submitted by the purchasing entity by referencing the product purchase transaction in a blockchain, storing the product review and product purchase transaction, creating a link to the product review; and transmitting the link to a product site where the product can be purchased.

DETAILED DESCRIPTION

Figure 1:
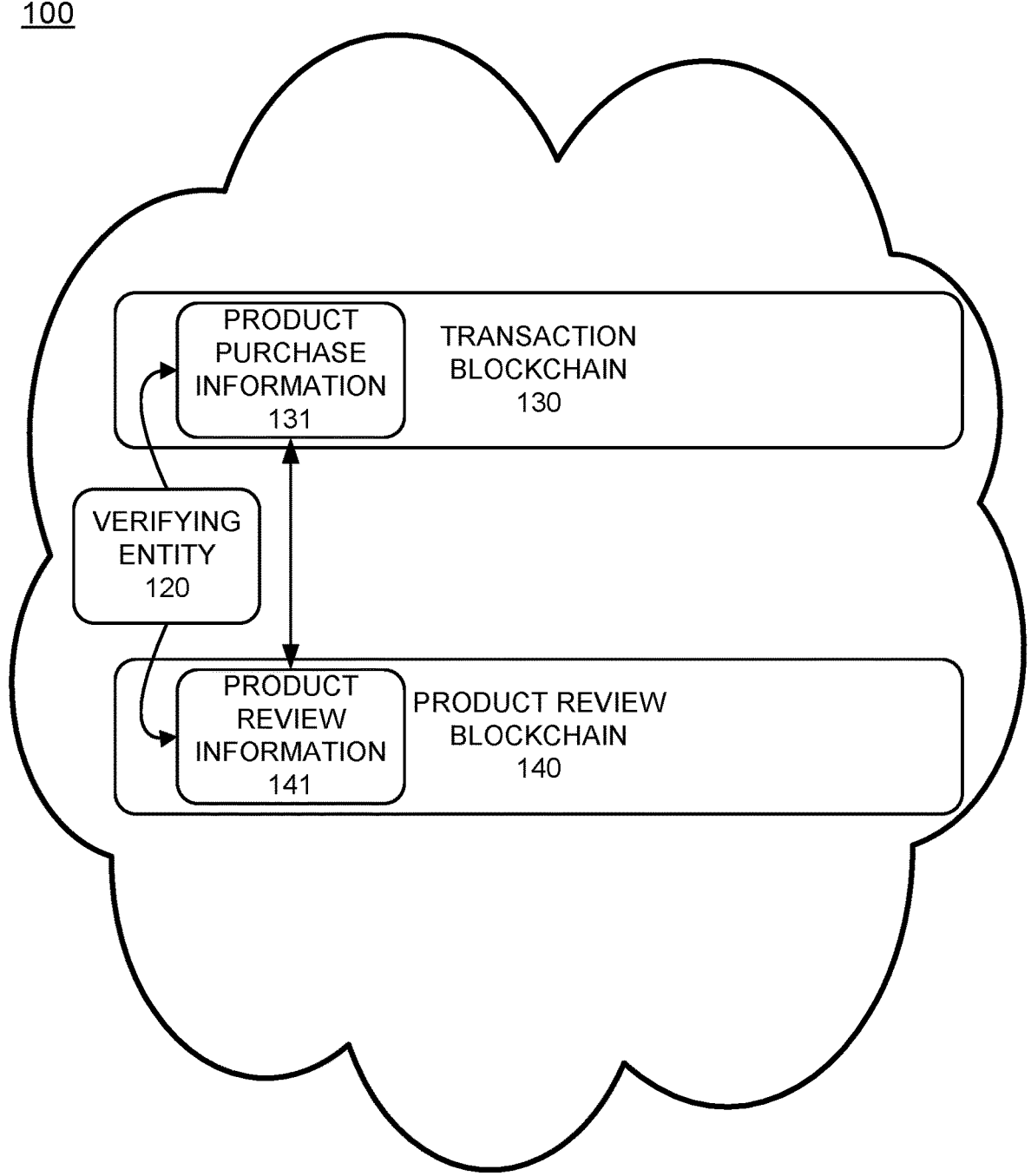
FIG. 1 illustrates a network diagram of a blockchain network configuration with blockchain transactions and product reviews according to example embodiments.

It will be readily understood that the instant components, as generally described and illustrated in the figures herein, may be arranged and designed in a wide variety of different configurations. Thus, the following detailed description of the embodiments of at least one of a method, apparatus, and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide an application and/or software procedure which provides a verification platform for product reviews on a blockchain. According to example embodiments, the blockchain configuration may support verifiable and authentic reviews that are linked to purchases that may be made on different e-commerce platforms for products and/or services. In operation, an observer (i.e., future buyer) can obtain proof that the person who wrote a particular review actually purchased the product or service. The reviews themselves can be stored on another blockchain platform not managed by any single entity, and can be collated across e-commerce platforms. An associated product/service and seller rating/reputation can be utilized which is backed by valid cross-platform information.

In one example, a method, non-transitory computer readable medium, device or system may be used for supporting verifiably authentic reviews linked to purchases that may be made on different e-commerce platforms. An observer (potential future buyer) can obtain proof that a person who wrote a particular review actually purchased the product or service. The blockchain configuration supports verifiably authentic reviews that are linked to actual purchases that may be made on different e-commerce platforms, utilizing different blockchains.

In operation, a purchase is performed and a product/service review has been logged. An observer, such as a future potential buyer can obtain proof that a review that is logged in a blockchain was actually written by a particular entity or individual and actually purchased the product or service. In one example, the reviews themselves are written onto another blockchain platform, such as a product review blockchain which may not be managed by any entity.

In general, e-commerce transactions are recorded as a smart contract on a blockchain platform. The transaction may involve multiple parties such as the seller, buyer, aggregator, delivery service provider and/or payment provider. The contract may terminate with the purchase and delivery of the product to the buyer. It is also noted that certain e-commerce aggregators can have their own private blockchains among their own group of participating entities. APIs provide access to the blockchain data to verify that a buyer purchased a particular product from a particular seller. If the review pertains to the delivery service provider (DSP), then confirmation that the buyer and DSP were actually involved in the transaction can be obtained. The e-commerce aggregators do not need to reveal their entire transaction history.

FIG. 1 illustrates a network configuration of a multi-blockchain configuration used to accommodate purchase transactions and review transactions. In operation, a user (reviewer) may write a review for a product or service, a seller, a delivery service provider, or any portion of a previous transaction conducted by the reviewer entity during an e-commerce purchase. Along with the review, the entity can be required to provide a proof of purchase in terms of the transaction details recorded on an e-commerce site's blockchain. Any entity reading the review can verify that the reviewer entity actually purchased the product or service and that the review is authentic based on data stored in the transaction blockchain and/or the product review blockchain.

Referring to FIG. 1, the network 100, represented as a network cloud, could be an enterprise network, the Internet, a private network, etc. The network 100 includes a transaction blockchain 130 with product purchase information 131 and a product review blockchain 140 with product review information 141. A verifying entity 120 may be any third party attempting to verify the transaction(s). Transaction details from different e-commerce blockchain platforms can be logged in any blockchain transaction ledger. Additionally, identities on multiple e-commerce platforms can be synced based on common identifying information for a user, such as e-mail, username or other identification information used to reference a previous entity logged with a transaction in the blockchain. The review information is recorded onto the product review blockchain, which may be a public blockchain that is not owned or managed by any single entity, and which will be a record for reviews of purchases made at different e-commerce websites/applications. An associated product/seller reputation configuration can be designed based on such authentic cross-platform reviews.

Figure 2:
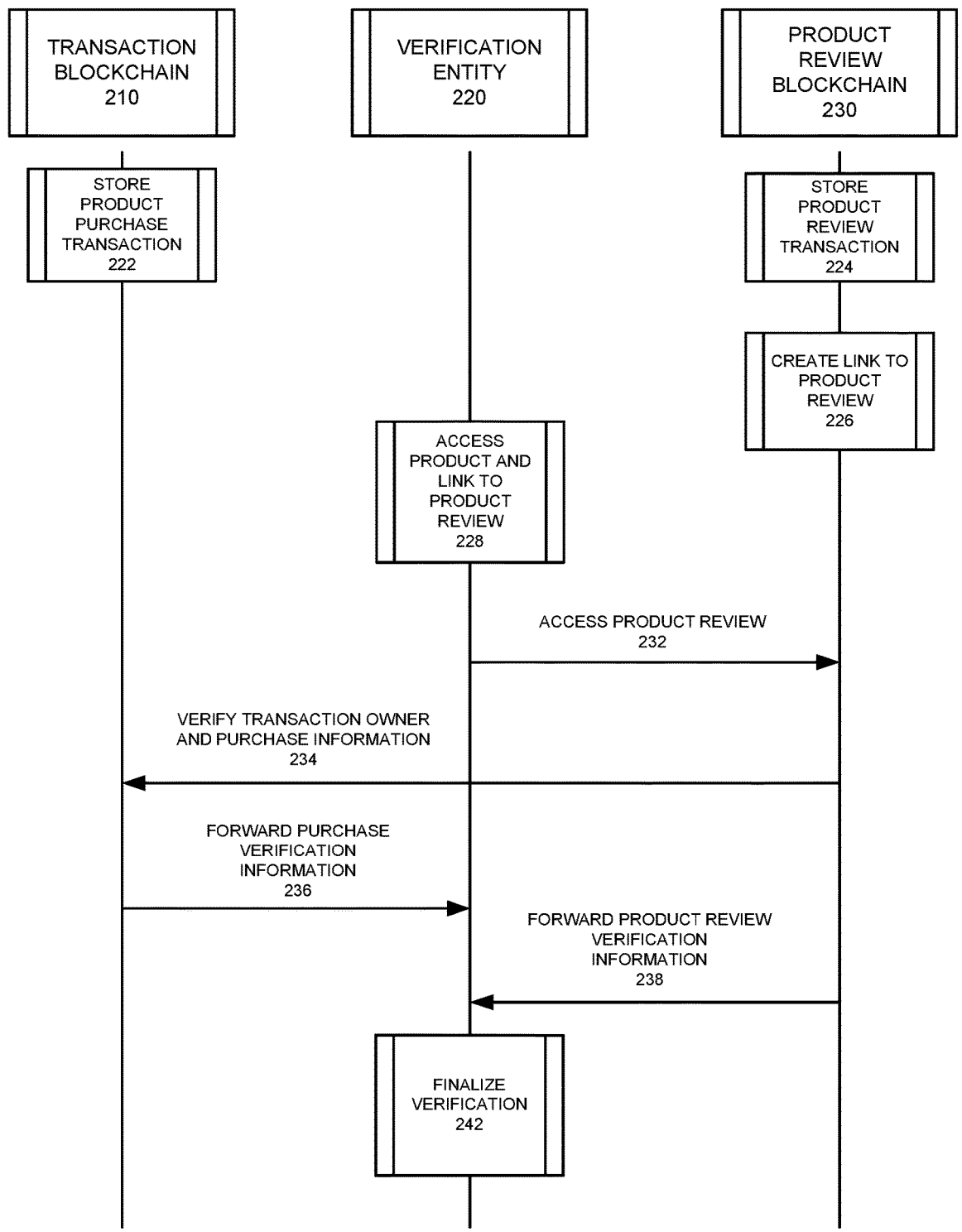
FIG. 2 illustrates a system signaling diagram of a product review verification configuration according to example embodiments.

FIG. 2 illustrates an example system diagram 200 of the signaling and communication among entities on a network according to an example embodiment. Referring to FIG. 2, the system includes more than one blockchain including but not limited to a transaction blockchain 210 which logs the transactions and a product review blockchain 230. A verification entity 220 may be any entity seeking to verify the validity of a previous transaction contemporaneous with, or independently of, a product searching operation, such as browsing products on an e-commerce site. The purchase transaction 222 and a subsequent product/service review 224 are logged prior to receiving an access attempt to verify such a transaction. Once the review is logged, a link (or other mechanism) 226 may be created to access the review which can be placed on a product page associated with the product purchased.

In operation, the verification entity 220 can access the product link and attempt to view the review 228. The access attempt may be identified 232 by the product review blockchain 230. The review may attempt to communicate 234 with the purchase transaction blockchain 210 to verify the credentials of the reviewing entity. The verification information 236 and the product review verification information 238 can be sent to the verification entity 220 for a final verification operation 242.

When logging information in the product review blockchain, each transaction in the product review blockchain, can contain the review itself and any metadata pertaining to the review (e.g., time/date of review, details of the purchase, such as store, time/date of purchase). The transaction will be digitally signed for security by the reviewer, so anyone viewing the review can validate that the review is authentic. The same user (i.e., reviewer) must also sign the transaction on the product purchase blockchain. This will provide evidence that the person who wrote the review, indeed purchased the product as well. When attempting to verify the validity of the product review, the transaction in the transaction blockchain should be referenced for a proof-of-purchase. The separate blockchains can operate independently of each other and only require that the same user submitted transactions on both blockchains. For instance, the same user device information is associated with a purchase of a product and recorded as the product purchase in the product purchase blockchain as a transaction, and then a review for the product can be submitted in the product review blockchain which includes a reference identifier to the original purchase transaction including a reference to a product name, purchaser name, purchase device information, date, time, product price, etc. This will permit anyone reading the review, to verify the identity of the user to be the same on both blockchains (product purchase blockchain and product review blockchain) and provide authenticated proof that the reviewer indeed purchased the product.

Figure 3A:
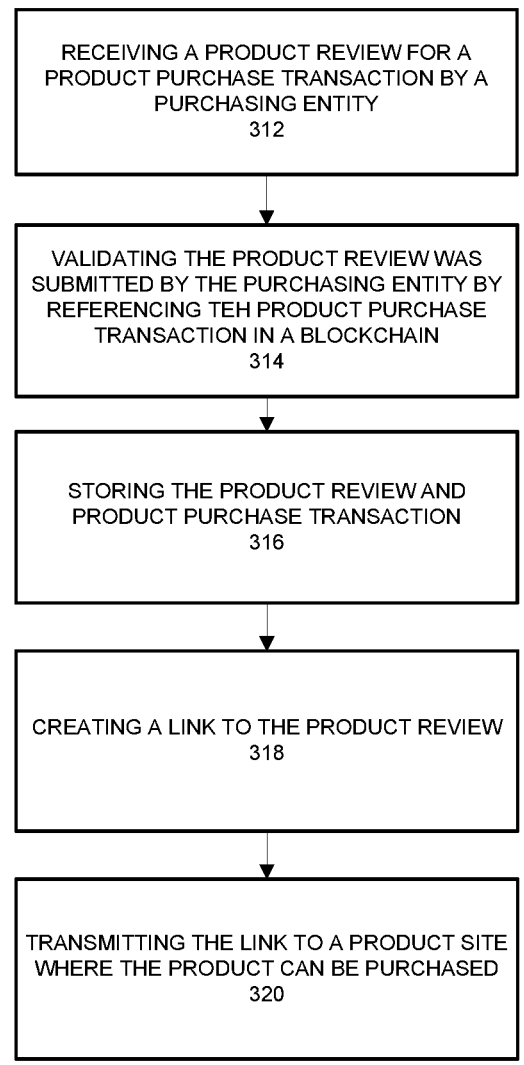
FIG. 3A illustrates a flow diagram of an example method of operation according to example embodiments.

FIG. 3A illustrates a flow diagram of an example method of operation according to example embodiments. Referring to FIG. 3A, the method 300 may include one or more of receiving a product review for a product purchase transaction by a purchasing entity 312, validating the product review was submitted by the purchasing entity by referencing the product purchase transaction in a blockchain 314, storing the product review and product purchase transaction 316, creating a link to the product review 318, and transmitting the link to a product site where the product can be purchased 320. Additional operations of the method may include storing the product review in a product review blockchain that is separate from the blockchain storing the product purchase transaction and validating the product review by accessing an application programming interface (API) of the product review blockchain. The method may also include validating the purchasing entity conducted the product purchase transaction by identifying a proof of purchase associated with the purchasing entity from the product purchase transaction in the blockchain. The proof of purchase may include an identifier associated with the purchasing entity. Also, the product review blockchain may be a publicly accessible blockchain or a private blockchain. The method may further provide storing the product review and the product purchase transaction in the same blockchain.

Figure 3B:
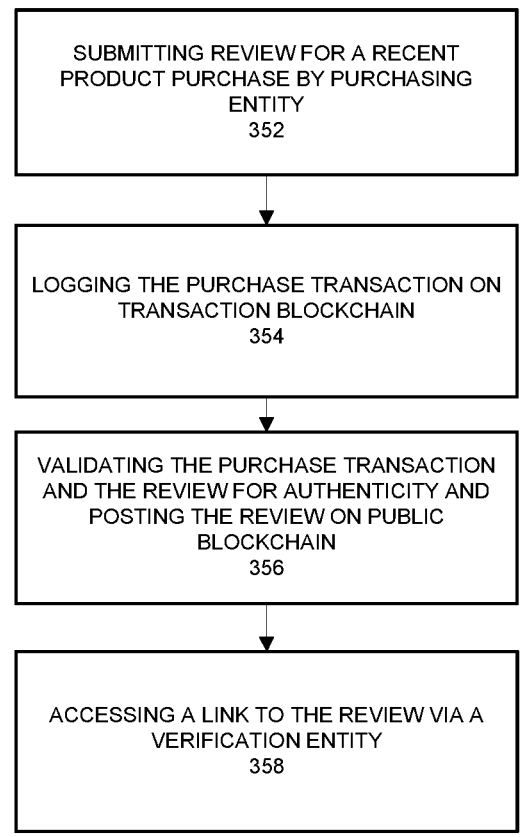
FIG. 3B illustrates a flow diagram of an example method of operation according to example embodiments.

FIG. 3B illustrates a flow diagram of an example method of operation according to example embodiments. Referring to FIG. 3B, the process 350 may include one or more of submitting a review for a recent product purchase by a purchasing entity 352. The process may also include logging the purchase transaction on a transaction blockchain 354. The process may also provide validating the purchase transaction and the review for authenticity and posting the review on the public blockchain 356. Additionally, the process may include accessing a link to the review via a verification entity 358.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
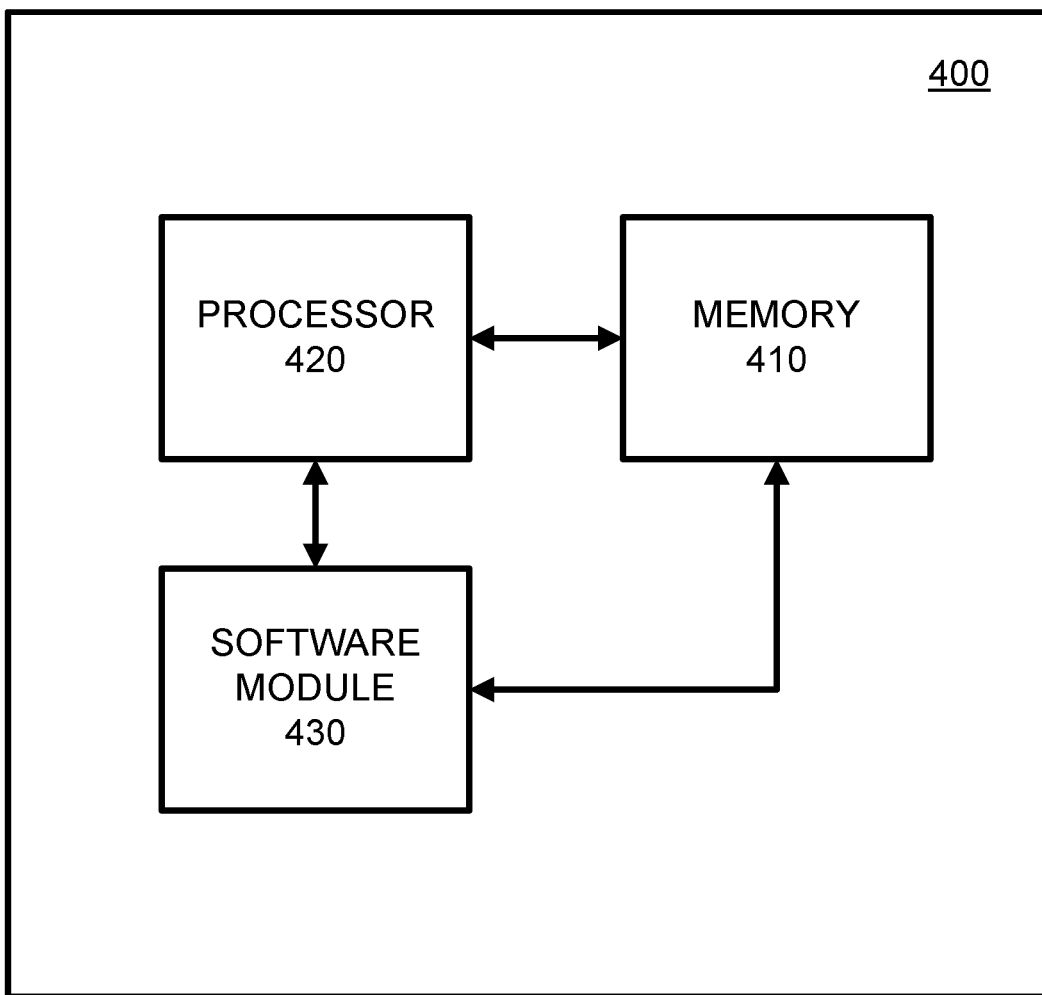
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computer-implemented method, comprising:
   attempting to access, via a verification device, a link that is stored on a website in association with a product, the link navigating to a review of the product;
   in response to attempting to access the link, receiving, via the verification device, content of a first blockchain transaction associated with a purchase of a product from a first blockchain, the content of the first blockchain transaction including a proof of purchase of the product and a digital signature of an entity that purchased the product, and receiving content of a second blockchain transaction comprising a product review of the product by the entity from a second blockchain, wherein the content of the second blockchain transaction includes the proof of purchase stored on the first blockchain and the digital signature of the entity, and the first blockchain and the second blockchain are independent of each other, wherein the second blockchain detects the attempted access and triggers the first blockchain to provide the proof of purchase; and
   verifying an authenticity of the product review by the entity based on a comparison of the digital signature of the entity stored in the first blockchain transaction and the digital signature of the entity stored in the second blockchain transaction.

2. The computer-implemented method of claim 1, wherein the method further comprises: accessing an application programming interface (API) of the second blockchain in response to a request to view the product review.

3. The computer-implemented method of claim 1, wherein the verifying comprises determining the product review is authentic when the digital signatures match.

4. The computer-implemented method of claim 1, wherein the receiving of the content of the second blockchain transaction comprises receiving transaction details from the first blockchain transaction stored in the second blockchain transaction.

5. The computer-implemented method of claim 1, wherein the second blockchain is a publicly accessible blockchain or a private blockchain.

6. An apparatus, comprising:
   a processor configured to:
   attempt to access a link that is stored on a website in association with a product, the link navigating to a review of the product,
   in response to attempting to access the link, receive content of a first blockchain transaction associated with a purchase of a product from a first blockchain, the content of the first blockchain transaction including a proof of purchase of the product and a digital signature of an entity that purchased the product, and receive content of a second blockchain transaction comprising a product review of the product by the entity from a second blockchain, wherein the content of the second blockchain transaction includes the proof of purchase stored on the first blockchain and the digital signature of the entity, and the first blockchain and the second blockchain are independent of each other, wherein the second blockchain detects the attempted access and triggers the first blockchain to provide the proof of purchase; and
   verify an authenticity of the product review by the entity based on a comparison of the digital signature of the entity stored in the first blockchain transaction and the digital signature of the entity stored in the second blockchain transaction.

7. The apparatus of claim 6, wherein, when the processor is configured to access an application programming interface (API) of the second blockchain in response to a request to view the product review.

8. The apparatus of claim 6, wherein, when the processor is configured to determine the product review is authentic when the digital signatures match.

9. The apparatus of claim 6, wherein the receiving content of the second blockchain transaction comprises receiving transaction details from the first blockchain transaction stored in the second blockchain transaction.

10. The apparatus of claim 6, wherein the second blockchain is a publicly accessible blockchain or a private blockchain.

11. A non-transitory computer readable storage medium storing one or more instructions that when executed by a processor cause the processor to perform:
   attempting to access a link that is stored on a website in association with a product, the link navigating to a review of the product;
   in response to attempting to access the link, receiving content of a first blockchain transaction associated with a purchase of a product from a first blockchain, the content of the first blockchain transaction including a proof of purchase of the product and a digital signature of an entity that purchased the product, and receiving content of a second blockchain transaction comprising a product review of the product by the entity from a second blockchain, wherein the content of the second blockchain transaction includes the proof of purchase stored on the first blockchain and the digital signature of the entity, and the first blockchain and the second blockchain are independent of each other, wherein the second blockchain detects the attempted access and triggers the first blockchain to provide the proof of purchase; and
   verifying an authenticity of the product review by the entity based on a comparison of the digital signature of the entity stored in the first blockchain transaction and the digital signature of the entity stored in the second blockchain transaction.

12. The non-transitory computer readable storage medium of claim 11, wherein the processor is further configured to perform accessing an application programming interface (API) of the second blockchain in response to a request to view the product review.

13. The non-transitory computer readable storage medium of claim 11, wherein the verifying comprises determining the product review is authentic when the digital signatures match.

14. The non-transitory computer readable storage medium of claim 11, wherein the receiving the content of the second blockchain transaction comprises receiving transaction details from the first blockchain transaction stored in the second blockchain transaction.

* * * * *